United States Patent [19]

van Mil

[11] 4,329,760
[45] May 18, 1982

[54] FOWL DEFEATHERING APPARATUS

[75] Inventor: Martinus P. G. van Mil, Boxmeer, Netherlands

[73] Assignee: Stork PMT BV, Netherlands

[21] Appl. No.: 118,659

[22] Filed: Feb. 4, 1980

[30] Foreign Application Priority Data

Feb. 6, 1979 [NL] Netherlands .................. 7900942

[51] Int. Cl.³ .......................................... A22C 21/02
[52] U.S. Cl. ................................................ 17/11.1 R
[58] Field of Search ................ 17/11.1 R, 16, 17, 18, 17/47, 11.1

[56] References Cited

U.S. PATENT DOCUMENTS

| 1,232,448 | 7/1917 | Jordan | 17/18 |
| 3,197,809 | 8/1965 | Corn et al. | 17/11.1 |
| 3,235,904 | 2/1966 | Brown et al. | 17/11.1 |
| 3,402,424 | 9/1968 | Brown et al. | 17/11.1 |
| 3,599,278 | 8/1971 | Crane | 17/11.1 R |
| 3,747,159 | 7/1973 | Harben, Jr. | 17/11.1 |
| 3,797,068 | 3/1974 | Dillon | 17/11.1 R |

FOREIGN PATENT DOCUMENTS

| 6515273 | 5/1967 | Netherlands . |
| 6515996 | 6/1967 | Netherlands . |
| 6717676 | 12/1967 | Netherlands . |
| 6805367 | 10/1968 | Netherlands . |
| 1263374 | 2/1972 | United Kingdom . |
| 1437370 | 5/1976 | United Kingdom ............ 17/11.1 R |

OTHER PUBLICATIONS

Stork-Gamco, D-8 Picker, D-16 Picker, D-16 GT Picker, D-1110 Picker, D-1120 Picker, D-1140 Picker, F201 Finishing Picker, Undated Technical Publi.

Primary Examiner—Willie G. Abercrombie
Attorney, Agent, or Firm—Newton, Hopkins & Ormsby

[57] ABSTRACT

Fowl picking apparatus provided with at least two rows of picking elements on both sides of the path of the fowl which carry picking discs with rotation axes displaced with respect to each other in the respective rows, such that during operation the circles described by the ends of the picking fingers at least touch each other, preventing fowl portions in getting behind the picking elements.

4 Claims, 3 Drawing Figures

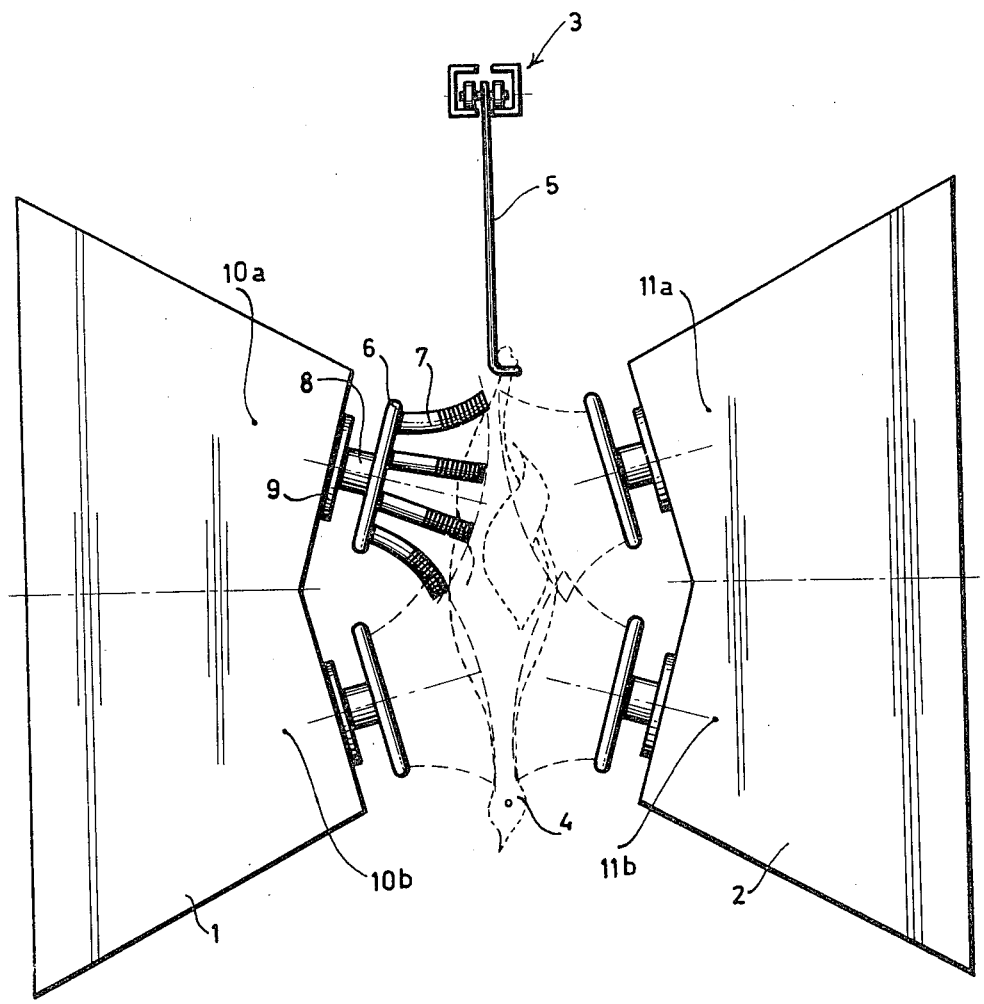
FIG:2.

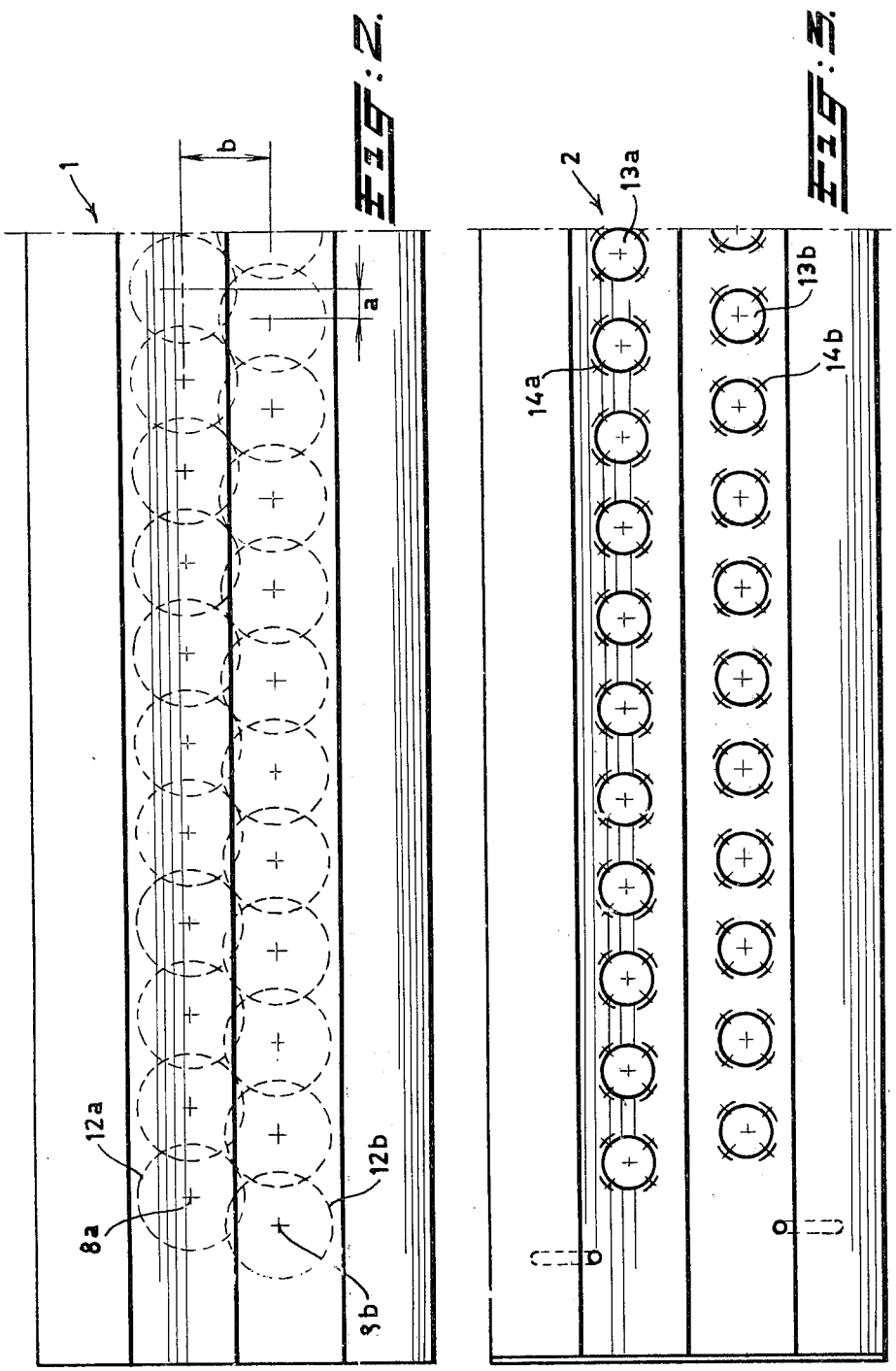

FOWL DEFEATHERING APPARATUS

BACKGROUND OF THE INVENTION

The invention relates to a fowl picking apparatus provided with picking elements disposed on both sides of the path in at least two rows located one above the other which carry picking elements directed toward the path of travel of the fowl and having axes of rotation directed toward the path which in the one row are located in a position which is displaced with respect to the axes of rotation in the other row.

Apparatus of this type is known per se from Dutch Pat. No. 138,716 or U.S. Pat. No. 3,235,904.

In these known picking apparatus there is a relatively great distance between the circles described by the ends of the picking fingers of the respective picking elements during operation, as a result of which fowl portions, for instance neck and/or wing tips, may get behind the disc-shaped picking finger supports and may thus get damaged. Such damaged fowl cannot be processed, so that this occurrence may cause considerable loss.

SUMMARY OF THE INVENTION

The invention provides for an apparatus of the type as outlined at the beginning which removes this drawback. The invention is based upon the insight that such damaging effects are avoided if care is taken to ensure that the displaced position of the axes of rotation with respect to each other is so chosen that during operation the circles described by the ends of the picking fingers at least touch each other, the arrangement being such that fowl portions are prevented from getting behind the picking elements.

As a result of this measure it is no longer possible for fowl portions to get in the area behind the picking elements, thus simultaneously precluding any possibility of damaging the fowl.

In a preferred embodiment two rows of picking elements located above each other, are disposed in one supporting beam, an angle of about 30° being enclosed between a plane through the axes of the elements of the upper row and a plane through the axes of the elements of the lower row.

The positioning of the picking elements of two opposite rows is such that the center lines of the elements in one row are displaced, in longitudinal direction of the rows, with respect to the center lines of the elements in the opposite row.

SURVEY OF THE DRAWINGS

FIG. 1 is a lateral view of a picking apparatus wherein the principle according to the invention is put into practice;

FIG. 2 is a schematic front view of half of this picking apparatus and shows circles drawn through the ends of the picking fingers in their position as assumed during operation;

FIG. 3 is a similar view, wherein the supporting beams of the other half of the picking apparatus are shown without the picking fingers, however.

DESCRIPTION OF A PREFERRED EMBODIMENT

The picking machine as schematically shown in the drawings consists of two housings 1, 2, disposed on each side of the guide path 3 of the fowl 4 which, being suspended on hooks 5, is conveyed along said path. The picking elements are comprised of picking discs 6, known as such, provided with picking fingers 7 substantially axially extending therefrom; the discs 6 are disposed at the ends of the driving shafts 8 which are mounted in supports 9, schematically indicated. The picking discs 6 are arranged in two rows located one above the other indicated by 10a, 10b for housing 1 and by 11a, 11b for housing 2. As is particularly apparent from FIG. 1, a plane through the center lines of the picking discs of the upper row 10a includes an acute angle with a similar plane through the center lines of the picking discs of the row 10b; this similarly applies to the rows 11a and 11b.

In the known picking apparatus of this type it frequently occurs in practice that, on account of the large spaces between the ends of the picking fingers of the various rows, portions of the fowl, in particular the wings, can get behind the picking fingers and be caught by the rotating disc or by the ends of the picking fingers implanted in the disc, which unvariably results in considerable damage to the fowl in question, which at that point is no longer suitable for further processing. The invention proposes a simple measure which removes this risk completely and the essence of which is clearly apparent from FIG. 2. The broken lines in this Figure show, at a scale reduced with respect to the drawing in FIG. 1, the circles described by the ends of the picking fingers in operation; these circles are referenced 12a and 12b for the upper row and lower row, respectively. As shown in FIG. 2, the picking discs are mounted in a manner such, that the center lines 8a of the upper row are in a position somewhat displaced with respect to the center lines 8b of the picking fingers of the lower row; this distance in a horizontal direction is indicated in FIG. 2 by "a". As a result, the circles described will at least touch each other. The distance in the direction perpendicular to the longitudinal direction, i.e. in the vertical direction indicated in FIG. 2 by the letter "b", has been so chosen that during operation also the circles described by the picking fingers of the two rows located above each other, at least touch one another. The Figure shows that the distance a and b have been selected so as to ensure that, rather than just touching, there is a certain overlapping of the circles described. The openings between the ends of the picking fingers, which by touching would be reduced considerably, are now in fact reduced to small triangular segments having bent limits, which do not offer any possibility whatsoever for any fowl portion to get through.

FIG. 3 is a view of the housing 2, but without the picking discs, this figure showing only the arrangement of the rows of openings 13a, 13b, wherein the various picking discs with their shafts and bearings are ultimately to be mounted and secured in the series of mounting holes 14a, 14b. In this case as well, the displaced arrangement is evident, it being likewise shown that the mutual arrangement of the opposite rows is such that also with regard to these rows the center lines of the picking discs are, over a short distance, displaced in the longitudinal direction of the rows.

What is claimed is:

1. A fowl picking apparatus comprising upper and lower opposing parallel rows of rotary picking elements turning in unison, each picking element including a disc body and a plurality of circumferentially spaced picking fingers projecting therefrom in a direction toward the picking elements of the opposing row, the picking elements of the upper and lower rows having their axes of rotation equidistantly spaced along the rows and the axes of rotation of the picking elements in the upper rows being offset from the axes of rotation of the picking elements in the lower rows in a direction along the upper and lower rows and equidistantly with respect to each upper and lower pair of picking elements, and the spacing between the upper and lower rows, between the rotary picking elements in the rows and said offset spacing being such that the circles defined by the tips of the picking fingers during rotation of the picking elements at least touch tangentially along the two rows and along inclined axes through the rotational centers of the offset picking elements of the upper and lower rows.

2. A fowl picking apparatus as defined in claim 1, and said circles defined by the tips of the picking fingers overlapping equidistantly along the upper and lower opposing rows and also overlapping by the same uniform distances along said inclined axes.

3. A fowl picking apparatus as defined in claim 1, and the axes of rotation of the rotary picking elements in the upper opposing rows converging downwardly and the axes of rotation of the picking elements in the lower opposing rows converging upwardly.

4. A fowl picking apparatus as defined in claim 1, and overhead conveyor means to move suspended fowl on a linear path between said opposing upper and lower rows of picking elements while the elements are rotating.

* * * * *